United States Patent
Matscheko et al.

(10) Patent No.: US 7,952,237 B2
(45) Date of Patent: May 31, 2011

(54) PRIMARY PART HAVING A COVER FOR A LINEAR MOTOR

(75) Inventors: Gerhard Matscheko, Starnberg (DE); Thomas Hoppe, Lemgo (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/599,423

(22) PCT Filed: May 7, 2008

(86) PCT No.: PCT/EP2008/055633
§ 371 (c)(1),
(2), (4) Date: Nov. 9, 2009

(87) PCT Pub. No.: WO2008/138831
PCT Pub. Date: Nov. 20, 2008

(65) Prior Publication Data
US 2010/0301684 A1   Dec. 2, 2010

(30) Foreign Application Priority Data
May 10, 2007 (DE) .......... 10 2007 021 929

(51) Int. Cl.
*H02K 41/02* (2006.01)
(52) U.S. Cl. ................... 310/12.18; 310/12.33
(58) Field of Classification Search .......... 310/86, 310/181, 12.01, 12.02, 12.18, 12.21, 12.23, 310/12.24, 12.33, 186
See application file for complete search history.

(56) References Cited

U.S. PATENT DOCUMENTS

| | | | | |
|---|---|---|---|---|
| 4,761,574 A | * | 8/1988 | Nakagawa | 310/12.27 |
| 5,179,304 A | * | 1/1993 | Kenjo et al. | 310/12.27 |
| 6,522,035 B1 | * | 2/2003 | Smit | 310/12.18 |
| 7,057,312 B2 | | 6/2006 | Hodzic et al. | |
| 7,800,256 B2 | | 9/2010 | Jajtic et al. | |
| 2006/0131967 A1 | | 6/2006 | Lin et al. | |

FOREIGN PATENT DOCUMENTS

| | | |
|---|---|---|
| DE | 19853250 A1 | 5/2000 |
| DE | 10157249 A1 | 6/2003 |
| DE | 10318207 A1 | 12/2004 |
| DE | 102004045992 A1 | 4/2006 |
| JP | 56041764 A | 4/1981 |
| JP | 62081968 A | 4/1987 |

* cited by examiner

*Primary Examiner* — Dang D Le
(74) *Attorney, Agent, or Firm* — Henry M. Feiereisen; Ursula B. Day

(57) ABSTRACT

A primary component for a linear motor includes at least one laminated core. A winding for creating a first magnetic field is arranged in the grooves of the laminated core. Permanent magnets create a second magnetic field and are arranged on the teeth of the laminated core. The primary component is provided for arrangement with a secondary component, and the primary component and the secondary component are spaced from each other by an air gap. The primary component includes a flat cover, arranged on the side of the primary component facing the air gap.

19 Claims, 2 Drawing Sheets

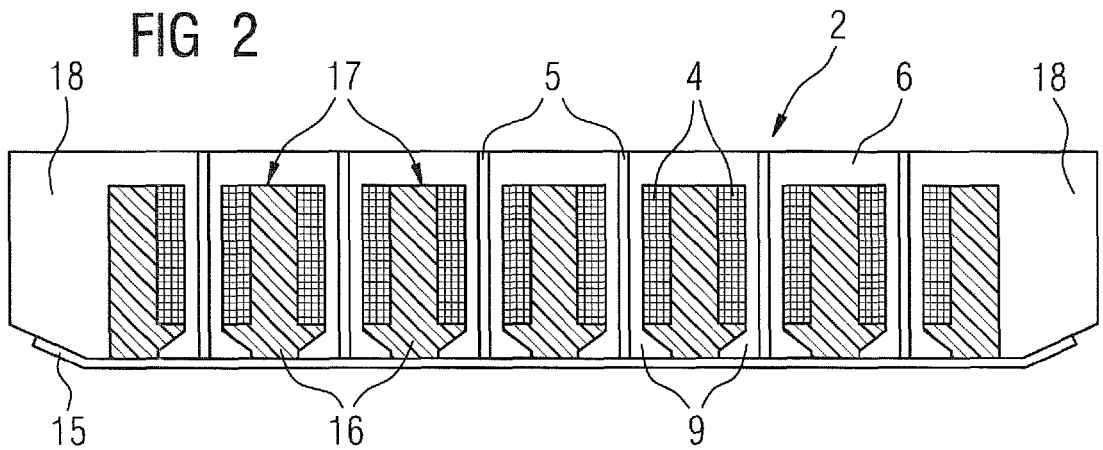
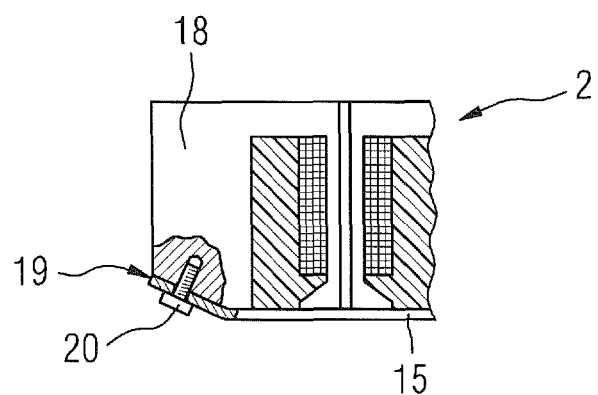
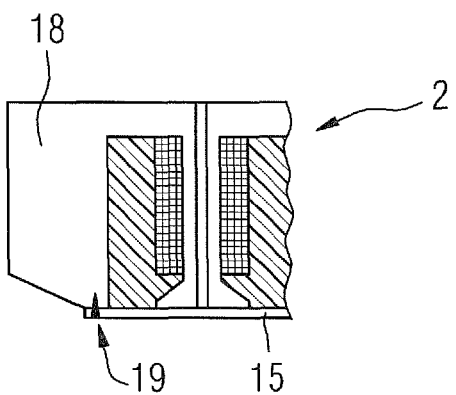
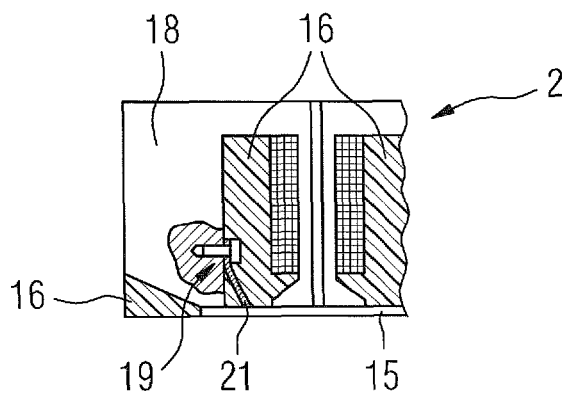

PRIMARY PART HAVING A COVER FOR A LINEAR MOTOR

CROSS-REFERENCES TO RELATED APPLICATIONS

This application is the U.S. National Stage of International Application No. PCT/EP2008/055633, filed May 7, 2008, which designated the United States and has been published as International Publication No. WO 2008/138831 and which claims the priority of German Patent Application, Serial No. 10 2007 021 929.8, filed May 10, 2007, pursuant to 35 U.S.C. 119(a)-(d).

BACKGROUND OF THE INVENTION

The invention relates to a primary part for a linear motor, wherein the primary part has at least one laminated core, wherein a first means for production of a first magnetic field is arranged in slots in the laminated core, and a second means for production of a second magnetic field is arranged on teeth of the laminated core, and wherein the primary part is intended for arrangement with a secondary part, and the primary part and the secondary part are separated from one another by an air gap. The invention also relates to a linear motor having a primary part such as this.

Electrical machines have a primary part and a secondary part. By way of example, the secondary part is a rotor of an electrical machine which operates by rotation, or else a moving part of a linear motor. By way of example, the primary part is in the form of a stator or a stationary part, with a single-phase or polyphase winding. In the case of linear motors, both the primary part and the secondary part may be in the form of a moving part.

Stator and rotors for electrical machines generally have a laminated core, comprising individual electrical laminates, wherein the winding or else permanent magnets for generation of magnetic fields is or are arranged on the laminated core. The individual laminates for the stator and rotor are generally stamped individually and are joined together, for example by stamped packaging, welding or brackets to form laminated cores.

In order to guide the main magnetic flux between the stator and the rotor, toothed laminates are normally used for stators/rotors to which windings are fitted. The winding is arranged in the slots in the laminates, or the laminated core. After the slots have been insulated, the winding is introduced, for example by pulling it in.

DE 10 2004 045 992 A1 discloses an electrical machine whose secondary part has no active means, for example windings through which a current can be passed or permanent magnets, for production of a magnetic field. In the case of a synchronous linear motor with permanent excitation and with a secondary part without any permanent magnets, the primary part has windings through which a current can be passed and permanent magnets, wherein the secondary part has only a toothed structure composed of a material containing iron.

Linear motors such as these are used in various fields of technology as drives, in particular direct drives, for example for machine tools, and processing machines such as automatic drilling, milling, turning, placement or bonding machines.

In this case, the linear motors are often subject to adverse environmental conditions. It is impossible to prevent dirt, for example swarf, working liquids such as oils, solid parts, workpieces, etc, from entering the motor area of the primary part, as damaging foreign substances. These foreign substances then also enter in particular the air gap in the linear motor, thus adversely affecting the life of the linear motor. Particularly if the air gap runs horizontally, it is impossible to prevent dirt from accumulating in the air gap or in the primary part or secondary part.

SUMMARY OF THE INVENTION

The object of the present invention is to provide a primary part for a linear motor, which has a cover and is therefore reliably protected, particularly in the area of the air gap, against foreign substances which could lead to an adverse affect on the operation of the linear motor. A further object is to provide a linear motor having a primary part which has a cover.

This object is achieved in accordance with the invention by a primary part for a linear motor, having at least one laminated core, wherein the laminated core comprises a large number of individual electrical laminates. The laminated core has slots and teeth, wherein a first means for production of a first magnetic field is arranged in slots in the laminated core, and a second means for production of a second magnetic field is arranged on the teeth. The primary part is intended to be arranged with a secondary part, wherein the primary part and the secondary part are separated from one another by an air gap. According to the invention, the primary part has a flat cover, which is arranged on that side of the primary part which faces the air gap.

The cover advantageously has material which can be magnetized. The primary part has at least two means for production of magnetic fields, wherein one means is, in particular, in the form of a single-phase or polyphase winding, and a further means has at least one permanent magnet. Since at least one permanent magnet is now located on the primary part, it is possible to use this magnetic attraction force of the permanent magnet. Since the cover is now composed of material which can be magnetized, this can easily be arranged on the primary part and adheres without the addition of further means, solely by the influence of the permanent magnets in the primary part. In particular, the primary part is designed such that it has a multiplicity of permanent magnets, which are preferably arranged on the teeth of the primary part, thus providing an adequate magnetic attraction force for the arrangement of the cover.

It has been found that the operation of the linear motor is not adversely affected by a primary part according to the invention having a cover composed of material which can be magnetized, and that this provides adequate protection against dirt and foreign substances.

The cover is advantageously in the form of a metal cover sheet and has stainless steel as the material which can be magnetized.

Covers composed of stainless steel adhere sufficiently firmly to the primary part, cost little, and can be produced, for example, as roll material.

Furthermore, the cover is preferably formed integrally and has a thickness in the region of tenths of a millimeter, for example 0.3 mm or 0.4 mm. If the cover is formed integrally, this avoids in particular butt joints, which are formed in the case of multipart covers, since dirt and dust can also accumulate in butt joints.

In a further advantageous refinement of the invention, a conductive connection is provided between the primary part and the cover in order to form a continuous grounding system. A cover such as this should be grounded in accordance with legal standards, for example the IEC standard. For this purpose, a conductive connection must be produced between the cover and ground, which represents the primary part. It has been found that a 100% contact is not ensured solely by the magnetic adhesion of the cover to the laminated core of the primary part, particularly when the linear motor is heated. A firm connection must therefore be produced between the primary part and the cover. By way of example, a conductive connection such as this can be produced by means of welding or soldering of the cover to the primary part. In this case, the cover is welded or soldered to the primary part at least one point, preferably to an end area or an end face.

The conductive connection to form a continuous grounding system can also be in the form of a copper strip between the cover and the primary part. For this purpose, the copper strip is attached to the primary part at least one point and is also designed such that it rests on the cover without mechanical attachment, so as to produce a continuous grounding system. It is also possible to mechanically fix the copper strip both to the primary part and to the cover.

A further possible way to produce the conductive connection is for the connection to be formed by means of at least one mechanical attachment element. By way of example, the attachment element is in the form of a screw, rivet, plug element, etc. The metal cover sheet or the cover is for this purpose screwed, for example, particularly to one end face of the primary part.

In a further refinement, the primary part has an encapsulation, wherein the cover can additionally be fixed by means of the encapsulation. Primary parts of linear motors are normally encapsulated in order on the one hand to produce electrical insulation and on the other hand to fill the slots, which are not entirely filled, and therefore likewise to provide protection against dirt and dust. The cover is preferably now arranged on the primary part, and the primary part is then encapsulated. The encapsulation of the primary part can therefore also be used for fixing the cover to the primary part. However, it is also possible to encapsulate the primary part before the cover is fitted. This has the advantage that the cover can then be removed and replaced at any time.

The cover is firmly connected to the primary part at least one point. In the case of linear motors which have self-cooling, the cover can also be firmly mounted at a plurality of points, for example on the two end areas or end faces, since the cooling is sufficient for material expansion not to occur as a result of thermal influences. In the case of externally cooled linear motors, it is advantageous to arrange the cover such that it is fixed at only one point, since the cover expands because the cooling is not optimum, in contrast to self-cooling, and since "waves" can be created in the cover.

The attachment in these cases should advantageously be designed such that the firm connection is in the form of a fixed bearing and, in a further area, is in the form of a loose bearing, wherein the cover can also be clamped, in particular on the loose attachment side. As a result of the arrangement of a fixed bearing on one side and a loose bearing on the other side, it is possible to compensate for material expansion resulting from thermal expansion.

A cover such as this for a primary part of a linear motor provides simple but reliable protection for the primary part against dirt and foreign substances. Furthermore, a cover which is in the form of a stainless-steel metal cover sheet represents an elegant option for the cover. In addition, it is possible to equip and retrofit linear motors which are already in use, and their primary parts, with a cover without a relatively large amount of effort. In the event of dirt or wear, a cover which is attached detachably can also be replaced.

The linear motor according to the invention is preferably in the form of a synchronous motor with permanent magnet excitation, wherein the secondary part is the stationary component, and the primary part is the moving component. The secondary part has no active means for production of magnetic fields while, in contrast, the primary part has at least two active means for production of magnetic fields which, in particular, are in the form of a single-phase or polyphase winding, through which current can be passed, and permanent magnets. In particular, the winding of the primary part is formed by means of tooth-wound coils, which are also referred to as pole coils.

The physical length of a primary part such as this may be made variable. In this case, primary parts can be arranged in a row up to the desired length. Any desired number of primary parts can be arranged in a row in any desired direction. The cover according to the invention may extend in one or more pieces over any desired number of primary parts, thus making it possible to form a continuous cover, and therefore adequately protect the entire primary part.

BRIEF DESCRIPTION OF THE DRAWING

Further features and details of the invention will be explained in more detail in the following description, with reference to exemplary embodiments and in conjunction with the attached drawing. In this case, features and relationships which are described in individual variants can in principle be transferred to all the exemplary embodiments. In the drawings:

FIG. 2 shows a linear motor according to the invention with a primary part with a cover, FIG. 3 shows a detail of a primary part according to the invention, with the cover being attached by means of a mechanical attachment element, FIG. 4 shows a detail of a primary part according to the invention, with the cover being fitted to the primary part by means of a welded joint, and FIG. 5 shows a detail of a primary part, with the cover and the primary part being connected to one another by means of a copper strip.

DETAILED DESCRIPTION OF PREFERRED EMBODIMENTS

Figure 1:
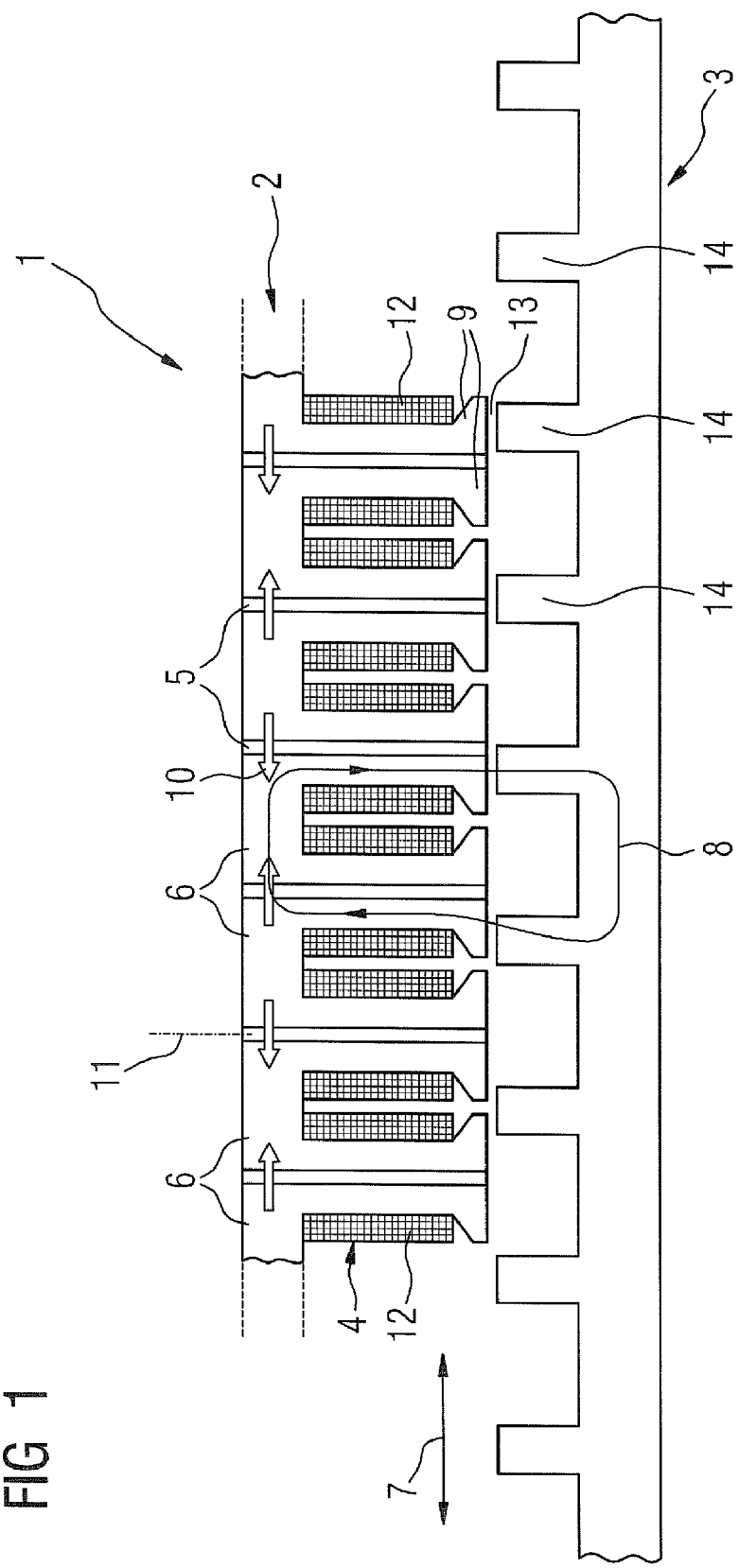
FIG. 1 shows an outline illustration of a linear motor with a primary part without a cover.

FIG. 1 shows an outline illustration of a linear motor 1, having a toothed secondary part 3 and a primary part 2. The primary part 2 has a winding 4 and permanent magnets 5. The primary part 2 is laminated, with the primary part 2 being composed of a plurality of individual laminated cores 6, which together form the entire laminated core. The direction in which the primary part 2 runs is indicated by means of a double-headed arrow 7, which runs in the longitudinal direction of the linear motor 1.

The permanent magnets 5 are used as toothed magnets, which are located between the individual laminated cores 6. In this case, one permanent magnet 5 is arranged essentially centrally in one tooth 9. The magnetic field which is produced by the permanent magnets 5 is indicated by the line 8 with arrows.

The magnetization direction 10 of the permanent magnets 5 is illustrated by the arrows 10. The permanent magnets 5 run essentially parallel to a coil axis 11 of a tooth-wound coil 12. All the tooth-wound coils 12 together produce the winding 4. Current of one and/or more phases can be passed through the tooth-wound coils 12. The air gap 13 is provided between the primary part 2 and the secondary part 3 and forms an air-gap plane, with the teeth 9 of the primary part 2 being adjacent to the air gap 13. The winding 4 of the primary part 2 is a first active means for production of a first magnetic field, and the permanent magnets 5 are a second active means for production of a second magnetic field. The secondary part 3 has no active means for production of magnetic fields, and has a toothed structure with the teeth 14.

FIG. 2 shows a primary part 2 according to the invention with a cover 15. No secondary part is illustrated in FIG. 2. The illustration in FIG. 2 corresponds essentially to the illustration in FIG. 1, but with the cover 15 now also being illustrated. The cover 15 has material which can be magnetized, is arranged on that side of the primary part 2 which faces the air gap 13 (see FIG. 1), and forms a continuous surface facing the air gap 13. Since the cover 15 has material which can be magnetized, this adheres to the permanent magnet 5. Furthermore, encapsulation 16 is illustrated, and fills all the cavities in slots 17 in which the winding 4 is arranged. In the exemplary embodiment shown in FIG. 2, the primary part is encapsulated, with the magnetic cover 15 being fitted outside the encapsulation 16. Furthermore, the FIG. shows the end areas of the primary part, which are in the form of front panels 18.

FIG. 3 shows a subarea of a primary part 2 with a cover 15, with a conductive connection 19 being provided between the cover 15 and the primary part 2, in order to form a continuous grounding system. According to the refinement shown in FIG. 3, the cover 15 is attached in the area of at least one front panel 18 of the primary part 2 by means of a mechanical attachment element 20. The attachment element 20 is in the form of a screw, with the screw being used to screw the cover 15 to at least one of the two front panels 18. To do this, the cover 15 must be angled such that it corresponds to the configuration of the front panel 18, in order to make it possible to produce a firm connection 19. The cover 15 preferably has a hole, thus allowing the attachment element 20 to be arranged appropriately.

FIG. 4 likewise shows a partial detail from a primary part 2 according to the invention with a cover 15. The conductive connection 19 between the primary part 2 and the cover 15 is made by welding the cover 15 to a front panel 18 of the primary part 2. The conductive connection 19 is therefore a welded joint, although a soldered joint can also be provided instead of the welded joint.

FIG. 5 likewise shows a partial detail of a primary part 2 according to the invention and a cover 15, with the conductive connection 19 being made by means of a copper strip 21. The copper strip 21 is attached to the inside of a front panel 18, for example by screwing, while in contrast the copper strip 21 simply rests on the cover 15. Although no firm connection is made between the copper strip 21 and the cover 15, a continuous grounding system can be produced, however, by appropriate bending and configuration of the copper strip 21. FIG. 5 also shows that the cover 15 is encapsulated by the primary part 2. The encapsulation 16 additionally mechanically fixes the cover 15, as a result of which the copper strip 21 is also additionally fixed to the cover 15.

What is claimed is:

1. A primary part for a linear motor, said primary part comprising:
   at least one laminated core;
   a first means arranged in slots of the laminated core to produce a first magnetic field;
   a second means arranged on teeth of the laminated core to produce a second magnetic field, said second means having at least one permanent magnet;
   a flat cover arranged on a side of the primary part in confronting relationship to an air gap by which the primary part is separated from a secondary part; and
   a conductive connection between the primary part and the cover to form a continuous grounding system.

2. The primary part of claim 1, wherein the cover contains magnetizable material.

3. The primary part of claim 2, wherein the magnetizable material includes stainless steel, said cover being configured in the form of a metal cover sheet.

4. The primary part of claim 1, wherein the cover is formed of single-piece construction.

5. The primary part of claim 1, wherein the cover rests on the side of the primary part in confronting relationship to the air gap and adheres to the primary part by the influence of one of the first and second means.

6. The primary part of claim 1, wherein the conductive connection is implemented by welding or soldering of the cover to the primary part.

7. The primary part of claim 1, wherein the conductive connection is a copper strip between the cover and the primary part.

8. The primary part of claim 1, further comprising at least one mechanical attachment element to secure the conductive connection to the primary part.

9. The primary part of claim 8, wherein the attachment element is an element selected from the group consisting screw, rivet, and plug element.

10. The primary part of claim 1, further comprising an encapsulation, said cover being fixed in place by the encapsulation.

11. A linear motor, comprising:
    a primary part having first and second means for production of magnetic fields, with one of the first and second means having at least one permanent magnet;
    a secondary part separated from the primary part by an air gap and constructed in the absence of producing a magnetic fields, wherein the primary part has a cover arranged on a side of the primary part in confronting relationship to the air pap; and
    a conductive connection between the primary part and the cover to form a continuous grounding system.

12. The linear motor of claim 11, wherein the cover contains magnetizable material.

13. The linear motor of claim 12, wherein the magnetizable material includes stainless steel, said cover being configured in the form of a metal cover sheet.

14. The linear motor of claim 11, wherein the cover rests on the side of the primary part in confronting relationship to the air gap and adheres to the primary part by the influence of one of the first and second means.

15. The linear motor of claim 11, wherein the conductive connection is a copper strip between the cover and the primary part.

16. The linear motor of claim 11, further comprising at least one mechanical attachment element to secure the conductive connection to the primary part.

17. The linear motor of claim 11, further comprising an encapsulation, said cover being fixed in place by the encapsulation.

18. The linear motor of claim 11, wherein the other one of the first and second means has a single-phase or polyphase winding.

19. The linear motor of claim 11, constructed in the form of a synchronous motor with permanent magnet excitation.

* * * * *